(12) United States Patent  (10) Patent No.: US 8,937,747 B2
Okada et al.  (45) Date of Patent: Jan. 20, 2015

(54) IMAGE PROCESSING DEVICE AND PROGRAM

(75) Inventors: Aya Okada, Ibaraki-ken (JP); Shoji Kurita, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 68 days.

(21) Appl. No.: 13/442,736

(22) Filed: Apr. 9, 2012

(65) Prior Publication Data

US 2012/0257226 A1  Oct. 11, 2012

(30) Foreign Application Priority Data

Apr. 11, 2011  (JP) ................................. 2011-086994

(51) Int. Cl.
*G06F 15/00*  (2006.01)
*H04N 1/23*  (2006.01)
*H04N 1/32*  (2006.01)
*H04N 1/00*  (2006.01)

(52) U.S. Cl.
CPC ............ *H04N 1/233* (2013.01); *H04N 1/2338* (2013.01); *H04N 1/32363* (2013.01); *H04N 1/32486* (2013.01); *H04N 1/00204* (2013.01); *H04N 2201/0039* (2013.01); *H04N 2201/0082* (2013.01)
USPC .............................. 358/1.9; 358/1.5; 358/537

(58) Field of Classification Search
USPC ..................... 358/1.1, 1.5, 1.9, 1.13, 2.1, 537
See application file for complete search history.

(56) References Cited

U.S. PATENT DOCUMENTS

| | | |
|---|---|---|
| 6,900,902 B1 | 5/2005 | Tanaka |
| 7,403,298 B2 | 7/2008 | Tanaka |
| 8,259,356 B2 | 9/2012 | Ohkawa |
| 2004/0257593 A1* | 12/2004 | Moffatt ........................... 358/1.9 |
| 2006/0055947 A1* | 3/2006 | Tanaka ............................ 358/1.9 |
| 2006/0221358 A1* | 10/2006 | Takahashi ........................ 358/1.1 |
| 2007/0013963 A1* | 1/2007 | Nakamura ....................... 358/403 |
| 2007/0070377 A1* | 3/2007 | Hirabayashi ................. 358/1.13 |
| 2007/0121149 A1* | 5/2007 | Takei et al. ................... 358/1.15 |
| 2007/0211287 A1* | 9/2007 | Fujii ............................. 358/1.16 |
| 2009/0273814 A1 | 11/2009 | Ohkawa |
| 2012/0069390 A1* | 3/2012 | Saito et al. .................... 358/1.15 |

FOREIGN PATENT DOCUMENTS

| | | | | |
|---|---|---|---|---|
| JP | 2000-112688 A | 4/2000 | | |
| JP | 2000141789 A | * | 5/2000 | ................. B41J 5/30 |
| JP | 2001-083759 A | 3/2001 | | |
| JP | 2009-272774 A | 11/2009 | | |
| JP | 2010-212813 A | 9/2010 | | |

OTHER PUBLICATIONS

An Office Action; "Notice of Grounds for Rejection," issued by the Japanese Patent Office on Nov. 18, 2014, which corresponds to Japanese Patent Application No. 2011-086994 and is related to U.S. Appl. No. 13/442,736; with English language partial translation.

* cited by examiner

*Primary Examiner* — Kimberly A Williams
(74) *Attorney, Agent, or Firm* — Studebaker & Brackett PC

(57) ABSTRACT

An image processing device to receive print data generated based on image data of an original document, the original document including color pixels and being determined to be printed by color printing, and to store the received print data in a storage unit in preparation for a possible reprinting operation based on the received print data, the device including: a redetermination unit configured to redetermine whether to carry out color printing or monochrome printing to achieve a printing operation to print a part of the original document by using the stored print data.

7 Claims, 3 Drawing Sheets

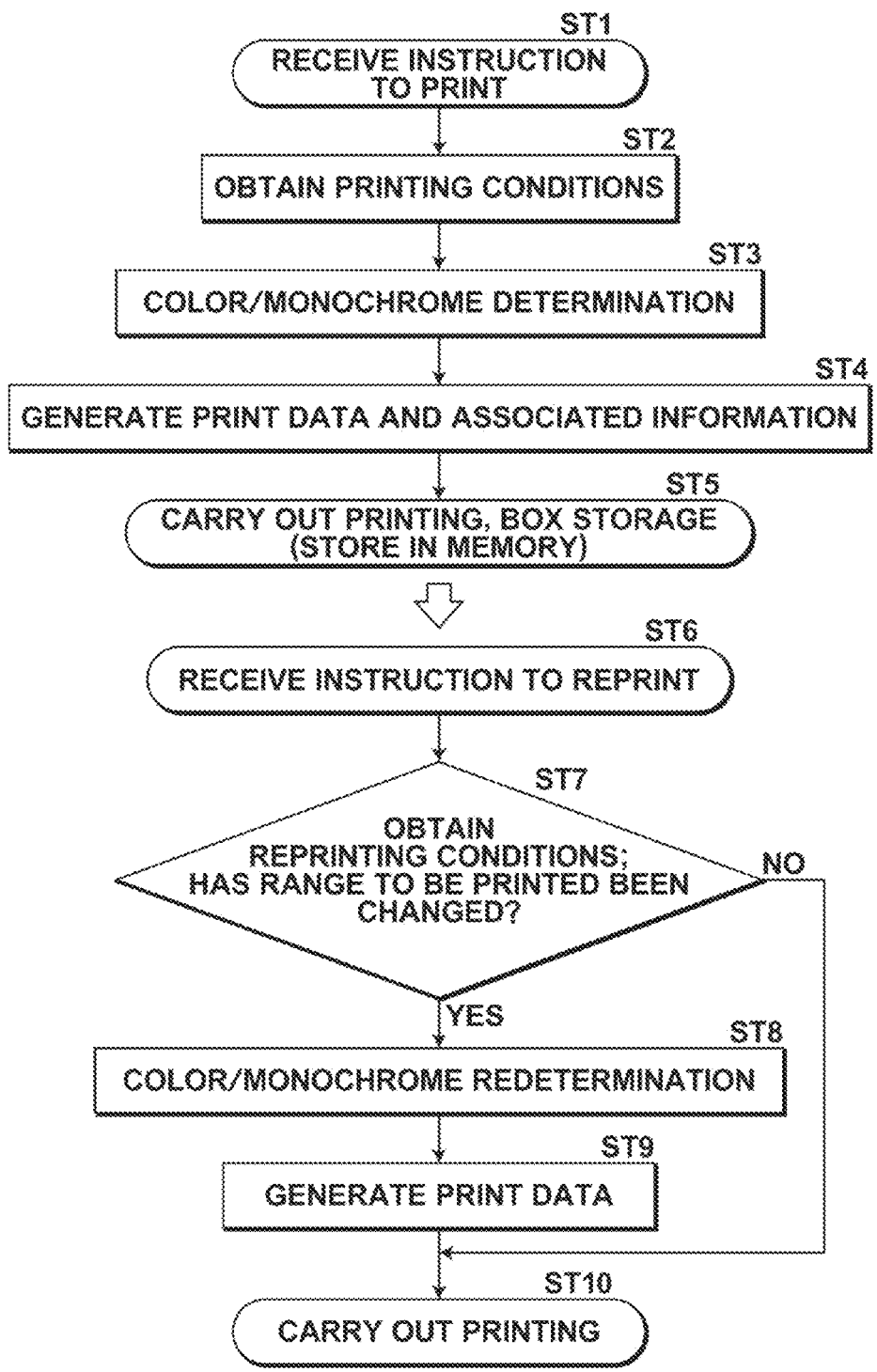

IMAGE PROCESSING DEVICE AND PROGRAM

BACKGROUND OF THE INVENTION

1. Field of the Invention

The present invention relates to an image processing device and an image processing program, where print data, such as CMYK data, which is generated during a previous printing operation is stored to allow a reprinting operation based on the stored print data.

2. Description of the Related Art

With respect to printing apparatuses that receive a print job from a client device, such as a computer, to carry out a printing operation, it is conventionally known that print data used during a previous printing operation is stored for a certain period of time and an instruction to reprint the stored print data is received by the printing apparatus to reprint the data.

Japanese Unexamined Patent Publication No. 2000-112688 proposes a printing apparatus, which determines, when a print job is received and is carried out, whether an original document to be printed is a color document or a black-and-white document. If it is determined that the original document is a color document, color printing is carried out. If it is determined that the original document is a black-and-white document, black and white printing carried out. Then, the result of the determination is stored together with the print data, so that color printing or black and white printing is carried out according to the result of the determination during a reprinting operation.

When a reprinting operation is carried out with selecting the stored print data, there may be cases where printing conditions, such as the print sheet size and the margin, are changed by the user, and as a result, a range to be printed of the original document may become a smaller part of the original document than the part of the original document printed during the first printing operation. For example, in a case where a reprinting operation is carried out with specifying a print sheet size smaller than that during the first printing operation or specifying a margin larger than that during the first printing operation, the size of an area of a print sheet where an image of the original document is printed is smaller than that during the first printing operation, and therefore the printed range is only a part of the original document that is smaller than the range of the original document printed during the first printing operation.

In such a case, the above-described conventional printing apparatuses, which carry out a reprinting operation with directly applying the result of the color/monochrome (such as black and white) determination during the first printing operation, always carry out color printing to achieve the reprinting operation whenever it is determined that the original document is a color document during the first printing operation, even if the printing range for the reprinting operation contains no part that is recognized as a color document, and this results in waste of printing costs.

SUMMARY OF THE INVENTION

In view of the above-described circumstances, the present invention is directed to providing an image processing device and an image processing program which allow carrying out a reprinting operation based on stored print data by color printing or monochrome printing which is suitable for a color state of an actually printed part of the print data.

An aspect of the image processing device of the invention is an image processing device to receive print data generated based on image data of an original document, the original document including color pixels and being determined to be printed by color printing, and to store the received print data in a storage unit in preparation for a possible reprinting operation based on the received print data, the device including: a redetermination unit configured to redetermine whether to carry out color printing or monochrome printing to achieve a printing operation to print a part of the original document by using the stored print data.

The "monochrome printing" herein refers to printing with a recording material (such as an ink) of a single color, such as simple black and white printing or grayscale printing. The "color printing" herein refers to printing with recording materials of two or more colors.

In the above-described image processing device, the storage unit may store positions of the color pixels in the original document, and the redetermination unit may calculate a number of the color pixels in the part of the original document or a ratio of the number of the color pixels relative to a number of total pixels in the part of the original document based on the stored positions of the color pixels to carry out the redetermination based on the calculated number of the color pixels or the calculated ratio of the number of the color pixels.

The "redetermination based on the number of the color pixels or the ratio of the number of the color pixels" herein refers to determining to carry out monochrome printing to achieve the reprinting operation if the number of color pixels or the ratio of the number of color pixels is smaller than a predetermined threshold value, and determining to carry out color printing to achieve the reprinting operation if the number of color pixels or the ratio of the number of color pixels is not smaller than the predetermined threshold value.

In the above-described image processing device, the storage unit may store, for each of at least one candidate part to be printed which possibly corresponds to the part of the original document, a value obtained by calculating, in advance, a number of color pixels in the candidate part or a ratio of the number of the color pixels relative to a number of total pixels in the candidate part, and the redetermination unit may carry out the redetermination based on the number of color pixels in the candidate part to be printed corresponding to the part of the original document or the ratio of the number of the color pixels in the candidate part to be printed corresponding to the part of the original document relative to the number of total pixels in the candidate part to be printed corresponding to the part of the original document.

In the above-described image processing device, the storage unit may store, for each of at least one candidate part to be printed which possibly corresponds to the part of the original document, a result of determination obtained by determining, in advance, whether to carry out color printing or monochrome printing to achieve a printing operation to print the candidate part to be printed, and the redetermination unit may carry out the redetermination according to the result of determination for the candidate part to be printed corresponding to the part of the original document.

The above-described image processing device may further include a print data generation unit configured to generate print data for the reprinting operation by generating print data for color printing by using the print data of the original document stored in the storage unit if the redetermination unit determines to carry out color printing to achieve the reprinting operation, and by generating print data for monochrome printing by using the print data of the original document stored in the storage unit if the redetermination unit determines to carry out monochrome printing to achieve the reprinting operation.

An aspect of the image processing program of the invention is a program for causing a computer to function as the above-described image processing device.

Note that the program of the present invention may be provided being recorded on a computer readable medium. Those who are skilled in the art would know that computer readable media are not limited to any specific type of device, and include, but are not limited to: floppy disks, CD's RAM'S, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

According to the image processing device and program of the invention, print data generated based on image data of an original document, which includes color pixels and is determined to be printed by color printing, is received, the received print data is stored in a storage unit in preparation for a possible reprinting operation based on the received print data, and when a printing operation to print a part of the original document is carried out by using the stored print data, redetermination as to whether to carry out color printing or monochrome printing to achieve the printing operation is made. This allows carrying out the printing operation in a printing mode (color printing or monochrome printing) which is suitable for a color state of the part to be printed. In particular, in a case where a part that is recognized as a color part in the part to be reprinted is negligible and it is not necessary to carry out color printing, redetermination can be carried out to achieve the reprinting operation by monochrome printing based on the result of the redetermination, without using the result of the first determination indicating color printing, thereby reducing printing costs.

With respect to the above-described image processing device and program, in the case where positions of the color pixels in the original document are stored in the storage unit, and the number of the color pixels in the part of the original document or a ratio of the number of the color pixels relative to the number of total pixels in the part of the original document is calculated based on the stored positions of the color pixels to carry out the redetermination based on the calculated number of the color pixels or the calculated ratio of the number of the color pixels, an amount of calculation can be reduced and thus a processing time taken for the redetermination can be reduced when compared to a case where the print data (such as CMYK data) is converted into image data of another format that is directly usable for the color/monochrome determination (such as RGB data or Lab data) to carry out the color/monochrome determination based on the converted data.

With respect to the above-described image processing device and program, in the case where, for each of at least one candidate part to be printed which possibly corresponds to the part of the original document, a value obtained by calculating, in advance, a number of color pixels in the candidate part or a ratio of the number of the color pixels relative to a number of total pixels in the candidate part is stored, and the redetermination is carried out based on the number of color pixels in the candidate part to be printed corresponding to the part of the original document or the ratio of the number of the color pixels in the candidate part to be printed corresponding to the part of the original document relative to the number of total pixels in the candidate part to be printed corresponding to the part of the original document, an amount of calculation can be reduced and thus a processing time taken for the redetermination can be reduced when compared to the case where the print data (such as CMYK data) is converted into image data of another format that is directly usable for the color/monochrome determination (such as RGB data or Lab data) to carry out the color/monochrome determination based on the converted data.

With respect to the above-described image processing device and program, in the case where, for each of at least one candidate part to be printed which possibly corresponds to the part of the original document, a result of determination obtained by determining, in advance, whether to carry out color printing or monochrome printing to achieve a printing operation to print the candidate part to be printed is stored, and the redetermination is carried out according to the result of determination for the candidate part to be printed corresponding to the part of the original document, an amount of calculation can be reduced and thus a processing time taken for the redetermination can be reduced when compared to the case where the print data (such as CMYK data) is converted into image data of another format that is directly usable for the color/monochrome determination (such as RGB data or Lab data) to carry out the color/monochrome determination based on the converted data.

BRIEF DESCRIPTION OF THE DRAWINGS

FIG. 4 is a flow chart for explaining operation of the printing system.

DESCRIPTION OF THE PREFERRED EMBODIMENTS

Figure 1:
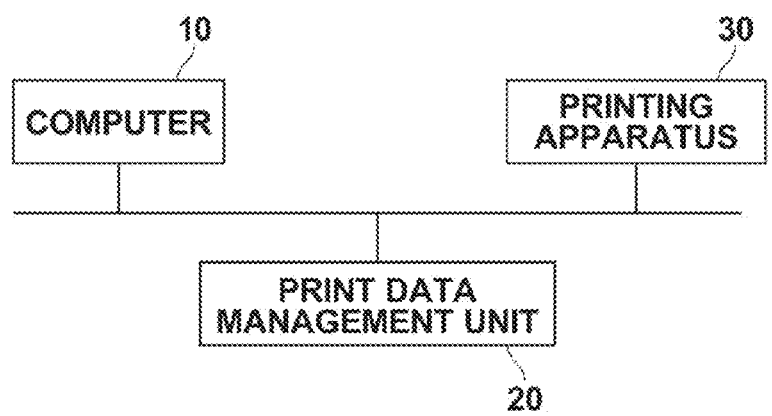
FIG. 1 is a diagram illustrating the schematic configuration of a printing system.

FIG. 1 illustrates the schematic configuration of a printing system according to one embodiment of the present invention. As shown in FIG. 1, this system includes a computer 10, a print data management unit 20, a printing apparatus 30, etc., which are connected via a network such that they can communicate with each other. Among them, the print data management unit 20 corresponds to one embodiment of the image processing device of the invention, and a software program which implements each function of the print data management unit 20 corresponds to the image processing program of the invention.

The computer 10 includes a memory for storing data and programs, a processing unit for executing the programs stored in the memory, a display, and an input device, such as a keyboard and a mouse. The memory contains software programs, which includes an application software, such as a memo pad application or Word (R), for implementing functions to generate image data representing an original document on the computer 10, a printer driver for implementing functions to generate, in response to an instruction to print an image of the original document by the user, print data which can be handled by the printing apparatus 20 based on the image data of the original document generated with the application software, etc.

As more specific functions necessary for generating the print data, the printer driver includes a user interface for receiving an input of printing conditions (such as the print sheet size, the margin size, the number of prints, etc.) by the user, and provides: a printing condition obtaining function for obtaining the printing conditions received via the user interface; a color/monochrome determination function for determining, for each pixel of the original document, whether the pixel is a color pixel or a monochrome pixel based on color balance of a pixel value (balance among RGB values, for example) of the pixel, where if the number of pixels determined to be color pixels is not smaller than a predetermined threshold value, it is determined to carry out color printing to achieve the printing operation, and if the number of pixels determined to be color pixels is smaller than the predetermined threshold value, it is determined to carry out monochrome printing to achieve the printing operation; a print data generation function for generating, based on the printing conditions and the result of the color/monochrome determination, print data (for example, CMY data or CMYK data if color printing is carried out, or C, M, Y or K data if monochrome printing is carried out) of a format that can be handled by the printing apparatus 20 from the image data of the original document generated with the application software, etc.

The printer driver further provides an associated information generation function for selectively generating any of first associated information, second associated information and third associated information, which will be described below, as information relating to the print data generated based on the image data of the original document, for which it is determined to carry out color printing to print it.

The first associated information is information representing the position of each color pixel in the original document. In this embodiment, the first associated information is position coordinates of each color pixel in the original document. The first associated information is found by obtaining the position coordinates in the original document of each pixel which is determined to be a color pixel during the above-described color/monochrome determination. The position of each color pixel in the original document directly corresponds to the position of each color pixel in the print data generated based on the image data of the original document.

The second associated information is a value obtained by calculating the number of color pixels in each of at least one candidate part to be printed, which possibly corresponds to a part of the original document to be printed during a reprinting operation based on the print data in a case where any of the printing conditions, such as the print sheet size or the margin size, is changed.

Figure 2:
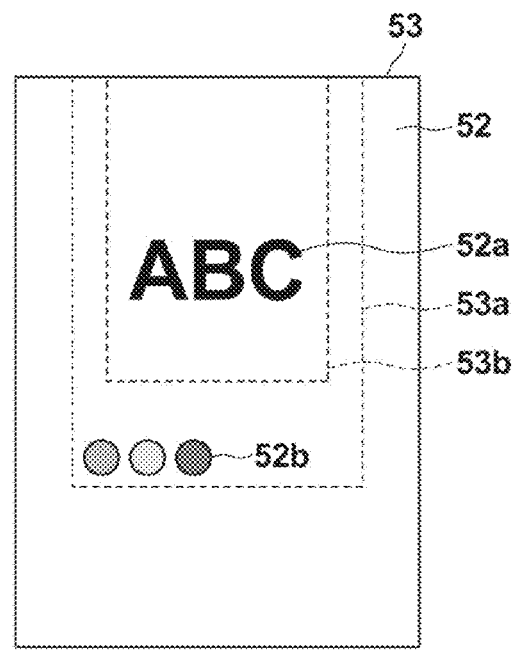
FIG. 2 is a diagram for explaining how associated information is generated by a printer driver.

For example, with respect to print data 53, as shown in FIG. 2, which is generated for printing an original document 52 including a part 52*a* formed by black (and/or gray) pixels and a part 52*b* formed by color pixels on an A3-size print sheet, there may be cases where the size of a print sheet used for the reprinting operation is changed into B4 or A4, and a resulting range to be printed of the original document corresponds to a candidate part to be printed 53*a* of the B4 size or a candidate part to be printed 53*b* of the A4 size located at a predetermined position (the upper end center portion in the example shown in FIG. 2) of the original document. Therefore, the number of color pixels in each of the candidate parts to be printed 53*a* and 53*b* is calculated, and the calculated number of color pixels is associated with identification information of each corresponding candidate part to be printed.

The number of color pixels in each candidate part to be printed is found by counting the number of pixels located in the candidate part to be printed among all the pixels which are determined to be color pixels during the above-described color/monochrome determination. As shown in FIG. 2, the result of calculation of the number of color pixels for the candidate part to be printed 53*b*, which does not include the part 52*b* formed by color pixels, is 0, and the result of calculation of the number of color pixels for the candidate part to be printed 53*a*, which includes the part 52*b* formed by color pixels, is a value larger than 0.

It should be noted that the predetermined position of the original document refers to a position of a part that is set in advance to be printed when a part of the original document is printed, such as an upper-left end portion, an upper end center portion, or the like, of the original document.

The third associated information is a result of determination obtained by determining, in advance, whether to carry out color printing or monochrome printing to achieve a reprinting operation based on the print data for each of the at least one candidate part to be printed, which possibly corresponds to a part of the original document to be printed during the reprinting operation in a case where any of the printing conditions, such as the print sheet size or the margin size, is changed.

For example, as described above, the number of color pixels in each of the candidate parts to be printed 53*a* and 53*b*, which are possible ranges to be printed of the original document during the reprinting operation in the cases where the size of a print sheet used for the reprinting operation is changed into B4 or A4, is calculated. If the calculated number of color pixels is not smaller than a predetermined threshold value, it is determined to carry out color printing to achieve the reprinting operation, and if the calculated number of color pixels is smaller than the predetermined threshold value, it is determined to carry out monochrome printing (black and white printing in this example) to achieve the reprinting operation. Then, the result of the determination is associated with the identification information of each corresponding candidate part to be printed.

The computer 10 further includes a communication means for outputting the print data generated by the printer driver and various types of information, such as the printing conditions, the result of the color/monochrome determination, the associated information, etc., associated with the print data to the print data management unit 20 and for outputting the print data to the printing apparatus 30.

The printing apparatus 30 includes: a memory for storing a list of print data stored in the print data management unit 20; an operation panel for causing the stored list to be displayed, receiving an input of an instruction to print by the user and receiving an input of the printing conditions; a communication means for sending information to identify print data, for which an instruction to reprint is received, printing conditions for the reprinting operation, etc., to the print data management unit 20, and receiving the print data from the computer 10 or the print data management unit 2; a printing means for carrying out printing on a print sheet based on the print data sent from the computer 10 or the print data management unit 20, etc.

The printing means includes a paper feeding mechanism, a conveyance mechanism, a paper discharging mechanism and an inkjet head, wherein a print sheet is fed toward the inkjet head, and the inkjet head ejects an ink line by line based on the print data sent from the computer 10 or the print data management unit 20 to form an image on the print sheet.

Figure 3:
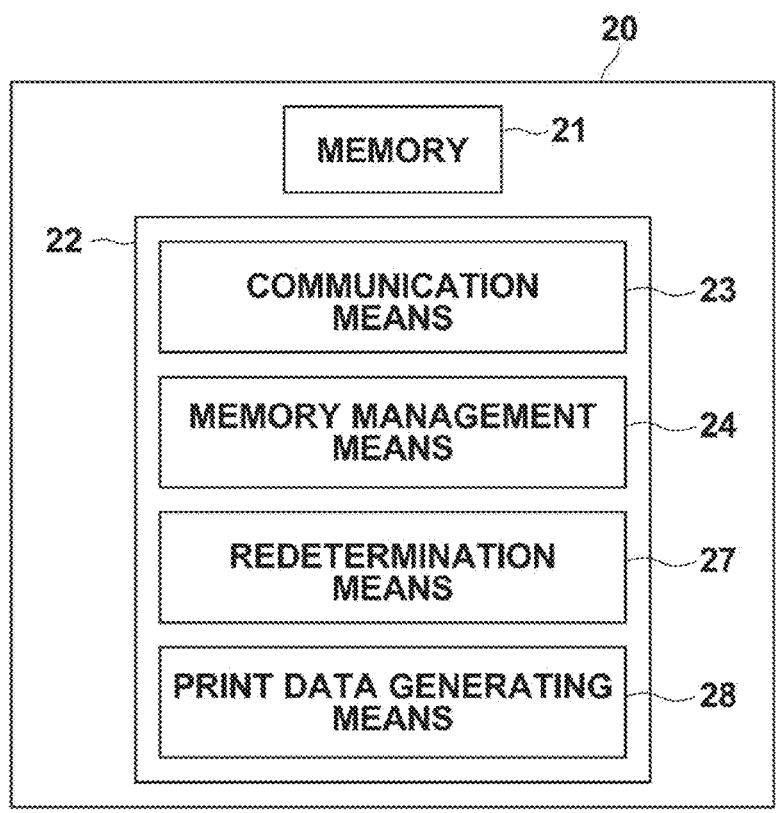
FIG. 3 is a block diagram illustrating the configuration of a print data management unit.

The print data management unit 20 stores the print data received from the computer 10, or the like, in a memory, receives a request to transfer print data for a reprinting operation, and provides the print data stored in the memory or data obtained by processing the print data, as necessary. As shown in FIG. 3, the print data management unit 20 includes a memory 21 for storing data and programs, a processing unit 22 for executing the programs stored in the memory, etc. FIG. 3 shows conceptual functions of a software program included in the processing unit 22.

As shown in FIG. 3, the print data management unit 20 includes: a communication means 23 for receiving the print data and the various types of information (such as the printing conditions, the result of the color/monochrome determination and the associated information) associated with the print data from the computer 10, receiving the information to identify print data, for which an instruction to reprint is received, and printing conditions for the reprinting operation (a request to transfer print data for the reprinting operation) from the printing apparatus 30, and sending the print data for the reprinting operation to the printing apparatus 30; a memory management means 24 for storing the print data and the various types of information associated with the print data received from the computer 10 in the memory 21; a redetermination means 27 for redetermining whether to carry out color printing or monochrome printing to achieve the reprinting operation in a case where the print data, for which the instruction to reprint is received, is print data for color printing (i.e., CMY data or CMYK data) and the printing conditions for the reprinting operation are different from the printing conditions associated with the print data; and a print data generating means 28 for generating print data for the reprinting operation by using the print data stored in the memory 21. It should be noted that, among them, the memory 21 and the memory management means 24 correspond to a storage unit of the invention.

When a request to transfer print data for a reprinting operation with respect to any of the print data for color printing stored in the memory 21 is received from the printing apparatus 30, the redetermination means 27 compares the printing conditions for the reprinting operation received from the printing apparatus with the printing conditions associated with the print data and stored in the memory 21 to determine whether or not any of the printing conditions, such as the print sheet size, that relates to the range to be printed has been changed, i.e., whether or not the range to be printed has been changed. If it is determined that the range to be printed has been changed, the redetermination means 27 determines whether to carry out color printing or monochrome printing to achieve the reprinting operation by using the printing conditions for the reprinting operation and the associated information associated with the print data and stored in the memory 21. Now, how this determination is specifically achieved is described.

If the associated information is the first associated information, the redetermination means 27 finds a coordinate range, which is the range to be printed, in the original document based on the printing conditions for the reprinting operation, and calculates the number of color pixels in the coordinate range based on the first associated information, i.e., the position coordinates of color pixels in the original document. If the calculated number of color pixels is not smaller than a predetermined threshold value, the redetermination means 27 determines to carry out color printing to achieve the reprinting operation. In contrast, if the calculated number of color pixels is smaller than the predetermined threshold value, the redetermination means 27 determines to carry out monochrome printing to achieve the reprinting operation.

If the associated information is the second associated information, the redetermination means 27 finds the range to be printed by using the printing conditions for the reprinting operation, and identifies one of the at least one candidate part to be printed in the second associated information that corresponds to (matches) the range to be reprinted. If the number of color pixels associated with the identified candidate part to be printed is not smaller than a predetermined threshold value, the redetermination means 27 determines to carry out color printing to achieve the reprinting operation. In contrast, if the number of color pixels associated with the identified candidate part to be printed is smaller than the predetermined threshold value, the redetermination means 27 determines to carry out monochrome printing to achieve the reprinting operation.

If the associated information is the third associated information, the redetermination means 27 finds the range to be printed by using the printing conditions for the reprinting operation, and identifies one of the at least one candidate part to be printed in the third associated information that corresponds to (matches) the range to be reprinted. Then, the redetermination means 27 determines whether to carry out color printing or monochrome printing to achieve the reprinting operation based on the result of color/monochrome determination associated with the identified candidate part to be printed.

In a case where a request to transfer print data for a reprinting operation with respect to any of the print data stored in the memory 21 is received from the printing apparatus 30 and the printing conditions for the reprinting operation have been changed from the printing conditions associated with the print data and stored in the memory 21, and thus the range to be printed has been changed, i.e., in a case where the reprinting operation cannot be achieved with directly using the print data stored in the memory 21, the print data generating means 28 generates print data for the reprinting operation by using the print data stored in the memory 21.

Specifically, if the print data, for which the instruction to reprint is received, is print data for color printing, the print data for the reprinting operation is generated from the print data (CMY data or CMYK data) stored in the memory 21 based on the printing conditions for the reprinting operation and the result of color/monochrome determination by the redetermination means 27. In particular, if the result of color/monochrome determination by the redetermination means 27 indicates color printing, print data for color printing (CMY data or CMYK data) is generated by using the print data of the original document stored in the memory 21. In contrast, if the result of color/monochrome determination by the redetermination means 27 indicates monochrome printing, print data for monochrome printing (any one of C, M, Y and K data, or the like) is generated by using the print data of the original document stored in the memory 21.

In contrast, if the print data, for which the instruction to reprint is received, is print data for monochrome printing, print data for the reprinting operation (K data, for example) is generated from the print data stored in the memory 21 (any one of C, M, Y and K data, or the like) based on the printing conditions for the reprinting operation.

Now, operation of the printing system of this embodiment is described with reference to the flow chart shown in FIG. 4. First, when an instruction to print the original document data generated with the application software in the computer 10 is made by the user (ST1), the original document data is outputted from the application software to the printer driver 12. Further, the printer driver in the computer 10 causes a printing condition receiving screen for receiving settings of the printing conditions, such as the print sheet size, the margin size and the scaling factor, to be displayed on the display of the computer 10, and obtains the printing conditions based on an input with a keyboard and/or a mouse made by the user on the printing condition receiving screen (ST2).

Then, the printer driver determines, for each pixel of the original document, whether the pixel is a color pixel or a monochrome pixel based on the color balance of the pixel value (for example, balance among the RGB values) of the pixel. If the number of pixels determined to be color pixels is not smaller than a predetermined threshold value, it is determined to carry out color printing to achieve the printing operation. In contrast, if the number of pixels determined to be color pixels is smaller than the predetermined threshold value, it is determined to carry out monochrome printing to achieve the printing operation (ST3). Then, the printer driver generates, based on the printing conditions obtained in step ST2 and the result of the color/monochrome determination obtained in step ST3, print data of a format that can be handled by the printing apparatus 20 from the image data of the original document generated with the application software. At this time, if the result of determination indicates color printing, CMY data or CMYK data is generated, and if the result of determination indicates monochrome printing, any one of C, M, Y and K data, or the like, is generated. Further, if the result of the color/monochrome determination obtained in step ST3 indicates color printing, the printer driver generates the first associated information, the second associated information or the third associated information, as described above, as information relating to the generated print data (ST4).

Then, the computer 10 outputs the print data generated in step ST4 to the printing apparatus 30, and the printing apparatus 30 carries out the printing operation based on the print data received from the computer 10. Further, the computer 10 outputs the print data and the various types of information, such as the printing conditions, the result of the color/monochrome determination and the associated information, associated with the print data to the print data management unit 20. Then, the memory management means 24 of the print data management unit 20 stores the print data and the various types of information associated with the print data received from the computer 10 in the memory 21 (i.e., so-called "box storage") (ST5).

Thereafter, when an instruction to print any of the print data stored in the memory 21 of the print data management unit 20 is received from the user via the operation panel of the printing apparatus 30 (ST6), the printing apparatus 30 sends the information to identify the print data, for which the instruction to reprint is received, and the printing conditions for the reprinting operation to the print data management unit 20, and the communication means 23 of the print data management unit 20 receives those information and conditions. Then, the redetermination means 27 of the print data management unit 20 identifies the print data, for which the instruction to reprint is received, from the print data stored in the memory 21 by using the information received from the printing apparatus 30, and compares the printing conditions for the reprinting operation received from the printing apparatus 30 with the printing conditions associated with the identified print data and stored in the memory 21 to determine whether or not any of the printing conditions, such as the print sheet size, relating to the range to be printed has been changed, i.e., whether or not the range to be printed has been changed (ST7).

If it is determined in step ST7 that the range to be printed has not been changed (NO), the communication means 23 of the print data management unit 20 sends the print data identified in step ST6 to the printing apparatus 30, and the printing apparatus 30 carries out the printing operation based on the print data received from the print data management unit 20 (ST10).

In contrast, if it is determined in step ST7 that the range to be printed has been changed (YES), the redetermination means 27 of the print data management unit 20 determines whether to carry out color printing or monochrome printing to achieve the reprinting operation by using the printing conditions for the reprinting operation received from the printing apparatus 30 and the associated information associated with the identified print data and stored in the memory 21. The manner of this determination varies depending on whether the associated information stored in the memory 21 is the first, second or third associated information, and the specific manners of determination are as described above (ST8). It should be noted that, if the print data, for which the instruction to reprint is received, is print data for monochrome printing, the result of color/monochrome determination is monochrome printing, and it is not necessary to directly carry out the determination.

Subsequently, the print data generating means 28 of the print data management unit 20 generates print data for the reprinting operation from the print data stored in the memory 21 based on the printing conditions for the reprinting operation and the result of the color/monochrome determination by the redetermination means 27. If the result of determination in step ST8 indicates color printing, CMY data or CMYK data is generated, and if the result of determination in step ST8 indicates monochrome printing, any one of C, M, Y and K data, or the like, is generated (ST9). Then, the communication means 23 of the print data management unit 20 sends the print data generated in step ST9 to the printing apparatus 30, and the printing apparatus 30 carries out the printing operation based on the print data received from the print data management unit 20 (ST10).

As described above, according to this printing system, the print data of the original document generated based on the result of the color/monochrome determination is stored in the manner of box storage so that it can be used for a reprinting operation, and when the reprinting operation is carried out, the color/monochrome determination is carried out again. Then, print data for the reprinting operation is generated or provided based on the result of the color/monochrome determination. Therefore, the reprinting operation can be carried out with a printing mode (color printing or monochrome printing) that is suitable for a color state of the part to be reprinted.

Although the case where the data to be stored in the manner of box storage is the print data that is generated in response to an instruction to print has been described in the above-described embodiment, an instruction to store the image data of the original document in the manner of box storage may directly be received, and the print data generated in response to the instruction may be stored in the manner of box storage. That is, the box storage may be carried out regardless of whether or not the stored print data will be printed.

Although the print data management unit 20 is a unit independent from the printing apparatus 30 in the above-described embodiment, the print data management unit 20 may be included in the printing apparatus 30.

Although the image data of the original document is generated with the application software in the computer 10 in the above-described embodiment, the image data of the original document may be image data obtained by reading an image of the original document with a reading device, such as an image scanner, included in (or independent from) the printing apparatus 30.

Although the case where the printing apparatus 30 for forming an image on a print sheet is an inkjet printing system has been described in the above-described embodiment, the printing apparatus 30 may be an apparatus of a different system, such as a screen printing system or a laser printing system.

What is claimed is:

1. An image processing device to receive print data generated based on image data of a sheet of original document, the sheet of original document including color pixels and being determined to be printed by color printing, and to store the received print data in a storage unit in preparation for a possible reprinting operation based on the received print data, the device comprising:
a redetermination unit configured to redetermine whether to carry out color printing or monochrome printing to achieve a printing operation to print a part of the sheet of original document by using the stored print data.

2. The image processing device as claimed in claim 1, wherein
the storage unit stores positions of the color pixels in the sheet of original document, and
the redetermination unit calculates a number of the color pixels in the part of the sheet of original document or a ratio of the number of the color pixels relative to a number of total pixels in the part of the sheet of original document based on the stored positions of the color pixels to carry out the redetermination based on the calculated number of the color pixels or the calculated ratio of the number of the color pixels.

3. The image processing device as claimed in claim 1, wherein
the storage unit stores, for each of at least one candidate part to be printed which possibly corresponds to the part of the sheet of original document, a value obtained by calculating, in advance, a number of color pixels in the candidate part or a ratio of the number of the color pixels relative to a number of total pixels in the candidate part, and
the redetermination unit carries out the redetermination based on the number of color pixels in the candidate part to be printed corresponding to the part of the sheet of original document or the ratio of the number of the color pixels in the candidate part to be printed corresponding to the part of the sheet of original document relative to the number of total pixels in the candidate part to be printed corresponding to the part of the sheet of original document.

4. The image processing device as claimed in claim 1, wherein the storage unit stores, for each of at least one candidate part to be printed which possibly corresponds to the part of the sheet of original document, a result of determination obtained by determining, in advance, whether to carry out color printing or monochrome printing to achieve a printing operation to print the candidate part to be printed, and
the redetermination unit carries out the redetermination according to the result of determination for the candidate part to be printed corresponding to the part of the sheet of original document.

5. The image processing device as claimed in claim 1, further comprising
a print data generation unit configured to generate print data for the reprinting operation by generating print data for color printing by using the print data of the sheet of original document stored in the storage unit if the redetermination unit determines to carry out color printing to achieve the reprinting operation, and by generating print data for monochrome printing by using the print data of the sheet of original document stored in the storage unit if the redetermination unit determines to carry out monochrome printing to achieve the reprinting operation.

6. The image processing device as claimed in claim 1, wherein the redetermination unit determines whether or not a range to be printed has been changed, and carries out the redetermination if it is determined that the range to be printed has been changed.

7. A non-transitory computer readable medium containing an image processing program for causing a computer to function as an image processing device to receive print data generated based on image data of a sheet of original document, the sheet of original document including color pixels and being determined to be printed by color printing, and to store the received print data in a storage unit in preparation for a possible reprinting operation based on the received print data, the image processing program causing the computer to function as:
a redetermination unit configured to redetermine whether to carry out color printing or monochrome printing to achieve a printing operation to print a part of the sheet of original document by using the stored print data.

* * * * *